Patented Nov. 6, 1928.

1,690,306

UNITED STATES PATENT OFFICE.

WALTER MIEG, OF VOHWINKEL, GERMANY, ASSIGNOR TO GRASSELLI DYESTUFF CORPORATION, OF NEW YORK, N. Y., A CORPORATION OF DELAWARE.

ANTHRAQUINONE VAT DYESTUFF.

No Drawing. Original application filed January 20, 1926, Serial No. 82,588, and in Germany January 21, 1925. Divided and this application filed May 24, 1927. Serial No. 193,948.

This invention relates to the preparation of vat dyestuffs of the anthraquinone series by submitting certain anthraquinone derivatives to an aluminum chloride fusion in the presence of tertiary bases and to certain new products prepared according to this process.

In several German patents, as for example, 136,015, 240,080, 249,000 and 262,788, the fusion of anthraquinone derivatives with aluminum chloride is described. In these patents, the substances are heated to temperatures of 220 to 270° C. in admixture with a large excess of aluminum chloride (up to 5 parts by weight).

We have found that such fusion can be carried out not only with smaller amounts of aluminum chloride, as for example, with only one part by weight, but also that it can be carried out at considerably lower temperatures if aluminum chloride is used in the presence of tertiary bases such as pyridine, quinoline, dimethylanilin, etc. For example, anhydrous aluminum chloride is mixed with one to four times its weight of dry pyridine, and a very well crystallizing compound of both components, which is soluble in excess pyridine, is obtained with evolution of heat, and then the substance that is to be fused is introduced with stirring. Then it is quickly heated to the reaction temperature which is about 100° C. lower than in the case of the acid aluminum chloride melts. The reaction product is thus obtained partly in the form of a leuco-compound from which it can be easily isolated by treatment with the oxygen of air.

The process just described presents very important advantages over the processes of the patents mentioned. Besides the diminution of the amount of aluminum chloride, the frothing which is very great in the case of the acid melts and which makes the process difficult, is lessened, and most important of all, the present process yields very pure products directly in excellent yields due to the lower reaction temperature and the presence of a base whereby the injurious effects of free hydrochloric acid at high temperatures are avoided. While for example, according to German Patent 240,080, 1.1′ dianthraquinonylamine yields a brown vat dyestuff on heating to 220° C. with aluminum chloride which is converted into a crystalline yellow dyestuff only after treatment with sodium hypochlorite at 80° C. according to the process of German Patent 251,021 and with considerable loss of yield, according to Example 1 of the parent application, a product is obtained at 120° C. which on contact with the oxygen of air yields the same yellow dyestuff in quantitative yields. Organic solvents of a non-basic nature cannot be used with the aluminum chloride fusion with the same results. For example, according to German Patent 206,464 a reddish-brown vat dyestuff is obtained by the action of aluminum chloride on 2-aminoanthraquinone with nitrobenzol as a diluent, whereas when pyridine is used in place of nitrobenzene, flavanthrene results at about 180° C. (Example 6) of parent application. Flavanthrene when prepared by melting 2-aminoanthraquinone with aluminum chloride alone, is obtained only at temperatures of 250 to 280° C. (German Patent 136,015).

The invention is illustrated by the following example:

Example.

Ten parts by weight of 4-benzoylamine-1.1′ dianthraquinonylamine are suspended in 50 parts by weight of pyridine, 16 parts by weight of anhydrous aluminum chloride are introduced and the mixture is heated for about twenty minutes to 125° C. until a homogeneous olive-brown melt results. The mixture is worked up by stirring it into dilute caustic soda which contains the amount of hydrosulfite necessary to reduce the dyestuff formed, and then the reaction product is separated by blowing in air and filtering the vat. The dyestuff is obtained in good yields and is difficultly soluble in high boiling organic solvents. It yields brown colored solutions in concentrated sulfuric acid. It dyes cotton very fast brown shades from cold and warm vats, and corresponds probably to the formula

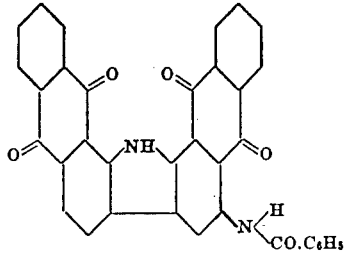

This is a division of my application Serial No. 82,588, filed January 20, 1926.

I claim:

As a new product the vat dyestuff which is obtainable by treating 4-benzoylamino-1-1'-dianthraquinonylamine with anhydrous aluminum chloride in presence of pyridine, which is chemically most likely a carbazol derivative, corresponding probably to the formula

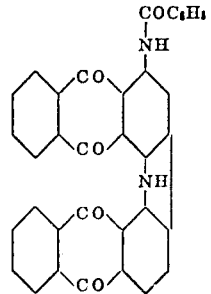

which is soluble in concentrated sulfuric acid with a brown color and dyes vegetable fibres from cold or hot vats very fast brown shades.

In testimony whereof, I affix my signature.

WALTER MIEG.